United States Patent [19]

Heitmann

[11] 3,918,958

[45] Nov. 11, 1975

[54] METHOD FOR THE PRODUCTION OF SPONGE IRON

[76] Inventor: Guenter Heitmann, Hedwigstr. 47, Essen, Germany

[22] Filed: July 25, 1972

[21] Appl. No.: 274,971

Related U.S. Application Data

[63] Continuation-in-part of Ser. No. 835,390, June 23, 1969, abandoned.

[30] Foreign Application Priority Data

June 24, 1968  Austria .............................. 6016/68

[52] U.S. Cl. ............................. 75/13; 75/36; 75/38
[51] Int. Cl. .............................................. C21c 5/52
[58] Field of Search ............... 75/11, 33, 36, 38, 34, 75/35, 12, 13

[56] References Cited
UNITED STATES PATENTS

| | | | |
|---|---|---|---|
| 1,407,372 | 2/1922 | Bradley | 75/10 |
| 1,937,822 | 12/1933 | Jones | 75/36 |
| 2,792,298 | 5/1957 | Freeman | 75/33 X |
| 2,855,290 | 10/1958 | Freeman | 75/33 |
| 2,915,379 | 12/1966 | Agarwal | 75/26 |
| 3,224,871 | 12/1965 | Collin | 75/36 |
| 3,235,375 | 2/1966 | Meyer et al. | 75/36 X |

*Primary Examiner*—L. Dewayne Rutledge
*Assistant Examiner*—M. J. Andrews

[57] ABSTRACT

A method and apparatus for the production of sponge iron, and preferably for the direct melting of the sponge iron in an electric arc furnace by the reduction of oxide containing iron ore, includes a preheating apparatus with a grate which is adapted to receive a charge of the iron-oxide containing ore. The ore is heated in the preheating furnace, in a neutral to oxidizing atmosphere, to the necessary reduction temperature and the hot gases for heating are advantageously admitted in a non-cocurrent flow, preferably in a counterflow manner. The preheated ore is subsequently reduced by directing it into a rotating tubular furnace which is advantageously tilted downwardly from its entrance end to provide for the discharge of the sponge material after treatment. While the ore is in the revolving furnace, it is reduced by blowing in a solid carbonaceous reducing agent at temperatures below the softening temperature of the furnace charge. The reduction temperature is maintained by blowing in fresh air at points distributed over the length of the reduction zone defined by the tubular furnace. The entire amount of the solid carbonaceous reducing agent or at least that required for the reduction of the ore is blown into the revolving tubular furnace from the same end at which the furnace is charged with the preheated ore. The furnace gases are conducted in the same direction as the ore and the reducing agent, and after use in the tubular furnace they are advantageously directed to a waste heat boiler for generation of steam for supplying power to the electric melting furnace. High volatile coal is preferably used as the reducing agent.

17 Claims, No Drawings

METHOD FOR THE PRODUCTION OF SPONGE IRON

This is a Continuation-In-Part of application Ser. No. 835,390, filed June 23, 1969 now abandoned.

SUMMARY OF THE INVENTION

This invention relates in general to a method and an apparatus for producing sponge iron, and, in particular, to a new and useful method for the production of sponge iron by direct reduction of oxide containing iron ore preferably for the production of highly metallized sponge iron which can be used for direct melting in an arc furnace and to an apparatus for carrying out the process.

A method is known for the production of sponge iron by the direct reduction of oxide containing iron ores where the unheated iron ore is mixed in the form of burnt pellets or in the form of lump ores with a reducing agent having a low volatile matter content, for example, anthracite or coke fines, and which is charged directly into a revolving tubular furnace. Inside the revolving tubular furnace the reduction heat is generated by gas or oil burners provided at its charging end and combustion air is also supplied at this end in an excess quantity. In this manner the ore as well as the reducing agent will move together inside the furnace in the same direction toward the discharge end of the revolving tubular furnace, as the furnace gases. Since the preheating of the ore and the reducing agent mixed with it in the furnace bed to the required reduction temperature is effected inside the same revolving tubular furnace in which the subsequent reduction to sponge iron takes place, the efficiency, particularly the thermal efficiency of this method and the plants for carrying out the method, is very poor. Another disadvantage is that extremely long revolving tubular furnaces (up to 120 meters or more) must be employed.

The thermal disadvantages of the prior art methods and apparatus are due to the fact that the ore pellets, although they have first been heated to the induration temperature for hardening, can only be inserted into the revolving tubular furnace in the cold or cooled state because of feeding and coal burning problems. Though the pellets mixed with the reduction coal can be heated relatively rapidly to the required reduction temperature in the first longitudinal zone of the revolving tubular furnace, using a high flame temperature and a great excess of air and oxygen in the operation of the auxiliary gas burners, the flame temperature of the burner and the amount of excess air which can be fed thereto are limited. This is because local superheating tends to take place which will lead to melting and sintering of the ore so that ring-shaped cakes of ore and coal are formed on the furnace wall. In order to avoid this, the flame temperature of the burner must not exceed about 1,300°C as a rule. Since the reduction temperature in the latter portion of the tubular revolving furnace should be at 1,100°C, there is only a temperature difference of about 200°C available for sufficient preheating of the solid furnace charge to the reduction temperature. This poor thermal utilization of the plant in respect of this method and the great length of furnace which is required is due to the fact that it is only possible to work with gas and oil burners arranged at the charging end of the revolving tubular furnace and therefore the entire heat supply is concentrated at the entrance end of the interior of the furnace. This causes the furnace temperature at the discharge end to be below the reduction temperature of about 1,100°C which is required for sufficient metallization. A further disadvantage is that only coal with a low content of volatile matter, and not coal with a high content of volatile matter, can be employed, the latter being preferable for the reduction of the ore pellets to sponge iron because the gases which are generated during the carbonization of the coal accelerate and intensify the reduction process, if the liberation of the gases takes place at reduction temperature. If coal with high volatile content were used in the above described method, the coal would already be coked in the preheating zone and the released gases would burn. This leads to the above indicated disadvantages of local super heating and sintering of the ore pellets. In addition, the gas which is now separated from the charge can no longer be used in the subsequent reduction of the furnace for accelerating and intensifying the reduction process. In such a method it is already known incidentally to use the hot waste gases issuing at the discharge end of the revolving tubular furnace for the production of electric current and to use the latter for the operation of melting furnaces.

It order to eliminate the aforementioned disadvantages of this process, a method for the direct reduction of the oxide containing iron ores to sponge iron is further known in which the ore is heated to the required reduction temperature with the ore and hot gases arranged for counterflow heating in a preheating device. The ore is directed after preheating through a chute into the entrance end of a tubular furnace. Into the discharge end of the tubular furnace, coal is blown as a reducing agent. Fresh air is directed into the furnace at spaced locations along the length of the reduction zone defined therein. The oxide containing ore can be charged into the preheating furnace in the form of pellets or in the form of lump ore. With this method and apparatus, a substantially better thermal efficiency is obtained and a better utilization of heat is achieved because of the counterflow of the ore and the hot gases in the preheating device. Better thermal utilization results also from the fact that the ore can be used in the form of green pellets which are then heat-hardened to the necessary strength during the preheating process.

With this method, the ore pellets are preheated to the reduction temperature, that is to a temperature of about 1,100°C, and they are reduced to metallized sponge iron in the revolving tubular furnace while the material is maintained in the same direction of flow. During the reduction, coal is blown into the discharging end in the same direction as the gas flow direction and compressed air is blown into the furnace along the length thereof. The produced low temperature coke which is discharged at the discharge end of the tubular furnace along with the sponge iron is reused again at the charging end of the furnace by being added to the charge ore by means of a feed worm conveyor.

Because the ore moves within the revolving furnace in the same direction as it does in the preheating furnace and because the waste gases obtained in the revolving furnace are used for preheating the ore in the preheating furnace in accordance with the present method, the ore and the furnace gases are both moved, in the preheating furnace and the revolving furnace where the reduction takes place, in opposite directions. The counterflow movement of the ore and the hot gases inside the preheating furnace has the advantage of a better utilization of the heat. The disadvantage of this counterflow of ore and furnace gases in the revolving furnace is that the coal can be utilized only incompletely as a reduction coal and the specific furnace chamber load is limited in the sense of a higher ore to coal ratio.

The blowing in of the coal at the charging side of the revolving tubular furnace is not possible because the coal would have to be blown in a direction counterflow to the gas current and in the range of the highest gas velocity. The blowing of the coal is therefore effected in the direction of the gas current at the discharge end of the revolving tubular furnace. This has the disadvantage, however, that the coal which can be only blown over a limited range of the furnace length remains unused to a great extent and is discharged together with reduced ore at the same end of the furnace at which it had been blown in. For this reason it is necessary in this method to charge the low temperature coke which is discharged with the reduced ore constantly again at the charging end of the revolving tubular furnace in order to ensure sufficient reduction of the ore in the whole range of the furnace operation.

The thermal efficiency with this method, using a temperature difference of about 800°C, is substantially better and therefore more economical due to the utilization in the preheating device of the waste gases obtained in the revolving tubular furnace. But the counterflow of ore and furnace gases in the revolving tubular furnace in combination with the charging of the low temperature coke at the charging end of the furnace has the essential disadvantage that not only the dust portion but also coarser portions of the low temperature coke are whirled out of the furnace due to the higher gas velocity at the charging end of the furnace. Since the amount of fine coke absorbed in this manner by the furnace waste gases and carried along does not remain steady but varies constantly during operation, a non-uniform furnace atmosphere is obtained in the preheating furnace, particularly in connection with the portion of carbonization gases which are contained in the furnace waste gas and having a varying reducing effect. The maintenance of abnormal conditions during the heat-hardening of the ore pellets is thus more difficult because it can only be accomplished to an optimum degree in a neutral to oxidizing atmosphere. In order to avoid this it is possible to subject the waste gases, which issue at the charging end of the revolving tubular furnace, to an after combustion before they have been transferred to the preheating furnace. However, this would result in different waste gas temperatures due to the varying dust portions in the waste gases and this would also render more difficult an optimum heat control in the preheating furnace.

Special difficulties are generally encountered in this method due to the fact that the transfer of the ore which is preheated to reduction temperature from the preheating furnace to the revolving tubular furnace must take place at the point of the highest gas velocity due to the counterflow of ore and furnace gases, and the feed of the low temperature coke to the ore or ore bed is also effected at the same point.

Finally, it is not possible or no longer economical in this method, due to the extensive utilization of the furnace waste gases, during the preheating of the ore to reduction temperature in the preheating furnace, to utilize the waste gas issuing from the preheating furnace at a temperature of only 300°C for the production of electrical energy. The electrical power required for the melting of the sponge iron must therefore be generated completely or predominantly in another way or it must be taken from an existing electrical supply line.

In accordance with the present invention the method of producing sponge iron by the direct reduction of oxide containing iron ores is improved and carried out more economically by avoiding the disadvantages inherent in the prior art methods. For the solution of the problems of the invention the entire amount of carbonaceous reducing agent, preferably high volatile coal which is required at least for the reduction of the ore, is blown into the revolving tubular furnace at the same end to which the preheated ore is also charged together with sulfur binding additives, if necessary. The furnace gases are conducted in the same direction as the ore and the reduction coal inside the revolving tubular furnace. The ore is separated from the gas in the preheating furnace by delivering it through a gas lock to the tubular furnace. Since the heating of the ore in any desired form to the reduction temperature in the preheating furnace can be effected by means of independently supplied outside fuel, both a constant furnace temperature and an optimum gas composition can be maintained at any time in the range of a neutral or oxidizing atmosphere. This permits both optimum heat utilization and the maintenance of optimum heat-hardening conditions, particularly for ore pellets. Because the furnace gases in the preheating furnace and in the revolving tubular furnace are completely separated from each other, it is possible, not only in the preheating furnace but now also in the revolving furnace, to conduct the furnace gases in an optimum manner for the reduction process; namely, in a direct flow both in respect of the ore and in respect of the coal. The ore bed is continuously supplied, if desired, over the entire length of the furnace, with the necessary amount of reduction coal because the coal is blown into the furnace in the same direction as gas and ore move and at the same time distributed on the surface of the furnace charge. This means that the coal is utilized in an optimum manner and it is unnecessary to reintroduce the small amount of excess low temperature coke which is discharged at one end of the furnace back into the charging end to get reduction of the ore also in this range of the furnace. Since the ore is fed at the upper furnace end and at a location at which the furnace gases flowing in the same direction have their lowest velocity, any turbulence of the fine components of the ore is avoided so that an even fine ore, Humphrey spiral concentrates, can be used safely in the method according to the invention, and any form of fine grain coal can be blown into the furnace.

The method of the invention permits substantially better ratio maintenance between the amount of ore and coal so that the specific furnace chamber load is considerably increased in the favor of a higher ore through-put and accompanied by an optimum degree of metallization of the sponge iron. Even if the low temperature coke obtained at the discharge end of the revolving tubular furnace is to be used again at the charging end of the revolving tubular furnace for economical reasons, this is more favorable with the inventive method. This is because the low temperature coke including its fine grain and dust portions is formed (generated) in smaller quantities and can be utilized completely for the reduction of the ore to sponge iron, because of the cocurrent flow of furnace gas and furnace charge. Because of the much better utilization of the coal for the reduction process in the revolving tubular furnace the method of the invention is superior to the known methods both with respect to the through-put of iron ore and with respect to the utilization of heat and the energy balance.

In accordance with another feature of the invention fine grained high volatile coal, particularly in the form of predried brown coal or lignite, is blown in at the charging end of the tubular furnace. Apart from the fact that the high volatile coal of this type is cheaper, it has the advantage, because of its higher portion of volatile constituents, that the reduction process is accelerated and the coal can be used in smaller quantities and, further, it has the other essential advantage that the reduction temperature can be kept lower, that is below 1,100°C, preferably between 950° – 1,050°C, with the same degree of metallization of the sponge iron, because of its higher reactivity.

Because of the possibility of the use of fine grain coal having a high content of volatile matter in connection with the better utilization of the coal as a reducing agent, there is an additional advantage that the energy contained in the furnace waste gas in the form of sensible and latent heat can be utilized in a particularly advantageous manner in the immediate production of electrical power for the operation, particularly of continuous arc melting furnaces. To this end the furnace waste gases still containing a great amount of latent heat are supplied with air in a combustion chamber arranged behind the revolving tubular furnace and burned to flue gas. The flue gas is fed either directly to a gas turbine for driving an electrogenerator or used in a waste heat boiler for generating steam which may be employed to drive a steam turbine coupled to an electric generator. In the latter case, the waste steam obtained in the steam turbine can further be used for pre-drying the ore charged into the preheating furnace and-/or for pre-drying the reduction coal blown into the revolving rubular furnace.

The hot furnace gases which are obtained at the discharge end of the revolving tubular furnace have a temperature of at least 1,000° to 1,100°C and any amount of additional heat which is introduced into the furnace remains in the waste gas in the form of latent heat. Therefore, it is possible to produce such an amount of electricity by utilizing the heat and such electricity may be used for the continuous melting of the sponge iron which is continuously fed into an electric arc furnace. The costs of the current produced in this way are much lower despite the higher investment costs for the plant than would be the case for obtaining electrical power from an outside source. The utilization of the furnace waste gases for the production of power is economical even if the sponge iron which is obtained in the plant is not melted on the spot but the current is fed to an existing electrical supply line.

If the sponge iron is melted in an arc furnace which is associated with the plant, it is possible and generally feasible to feed the sponge iron obtained at the discharge end of the revolving tubular furnace together with at least a part of the low temperature coke still contained therein directly to the charging device of the arc melting furnace with the exclusion of oxygen. In this manner the sensible heat may be employed for the melting process. In some cases, however, it is more advantageous to feed the sponge iron obtained at the discharge end of the revolving tubular furnace and the low temperature coke mixed with it under exclusion of oxygen first to a cooling device, particularly in the form of a water-cooled cooling drum, and to effect at least a partial separation of the sponge iron and the low temperature coke in a series-connected preparation plant. The preparation plant is preferably separated from the sponge iron cooler by a gas lock.

Accordingly, it is an object of the invention to provide an improved method for producing sponge iron, preferably highly metallized sponge iron, which is suitable for the direct melting of the sponge iron in an electric arc furnace by the direct reduction of an oxide-containing iron ore comprising heating the ore in a pre-heating furnace to reduction temperature and using a hot neutral to oxidizing gas in counterflow movement to the movement of the ore, subsequently reducing the ore to sponge iron while maintaining its movement along a revolving tubular furnace, and simultaneously blowing in coal as a reducing agent from the same end of the revolving furnace as the charging of the preheated ore by means of compressed air, and preferably blowing in fresh air at points distributed along the length of the reduction furnace while the gases are directed in the same direction as the movement of the ore through the furnace.

A further object of the invention is to provide a method of producing sponge iron where a fine grain coal, that means coal with a grain size of 10 mm and with a high content of volatile matter, is blown into a rotating tubular furnace and, preferably, comprises a pre-dried lignite and that the furnace is maintained at a reduction temperature substantially constant between about 950° and 1,200°C, and wherein the furnace waste gases are led off from the tubular furnace and advantageously used for recovering heat by the generation of steam for generating electric power for operation a preferably continuous melting furnace for the sponge iron produced.

A further object of the invention is to provide a device for producing sponge iron which includes a furnace for preheating the oxide-containing ore and which advantageously includes a preheating gate and means for circulating heating gases in reverse direction to the movement of the grate, and a rotating tubular furnace connected to the preheating furnace through a gas-tight lock for transferring the preheated ore into the rotating tubular furnace, and wherein the tubular furnace includes means for blowing reduction coal with compressed, preferably preheated, air into the furnace from the charging end and in the direction of movement of ore through the tubular furnace, the discharge end of the tubular furnace including means for separating the hot sponge iron mixed with residual coke from the flue gases.

A further object of the invention is to provide an inexpensive and simple method of producing sponge iron and providing an apparatus for producing sponge iron which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The only FIGURE of the drawing is a schematic sectional representation of an apparatus for producing sponge iron and for melting the iron, constructed in accordance with the invention.

GENERAL DESCRIPTION OF THE PREFERRED EMBODIMENT

With reference to the drawing, the invention embodied therein comprises a device for producing sponge iron from an oxide-containing iron ore and for the direct melting of the sponge iron in an electric arc furnace. The oxide-containing iron ore is charged, in the form of green pellets, into a preheating device 1 which includes a movable endless grate 50 arranged to receive a charge of iron-oxide ore through a charging opening 52 and to deliver the heated ore downwardly in the direction of arrow 54 into a lock 3 which is gas tight and permits the controlled delivery of the preheated material into a chute 4 extending into the upper end of a downwardly inclined tubular furnace 7. The iron ore is preheated on the grate 50 by means of hot gas conducted in the direction of the arrows 2 in counterflow relative to the ore. Advantageously, the gas is produced by an oil or gas burner (not shown) which is operated with excess air. The gas maintains a heating temperature to the required reduction temperature of about 1,100° C.

The ore pellets flow from the preheating grate 50 through the gas-tight lock 3 and the series-connected chute 4 into the charging end 5 of the rotating tubular furnace 7 which is inclined downwardly toward the discharge end 6. A blowing device 8 is directed into the charging end of the revolving tubular furnace and it provides a supply of fine grain pre-dried lignite 10 which is blown in by compressed air 9 into the charging end of the furnace and is supplied in the direction of the arrow 56 throughout the reduction zone defined within the tubular furnace 7. The lignite is advantageously mixed with a sulfur-binding additive such as dolomite, for example. Fresh air is injected into the tubular furnace 7 at points distributed over its length by blowers 11 which direct air through connecting ducts 12.

At the discharge end 6 of the revolving tubular furnace, the hot furnace waste gases containing latent heat are permitted to pass into a secondary combustion chamber 14 and they arrive in the chamber at a temperature of about 1,100°C. These waste gases are burnt by means of preheated fresh air 15 into flue gases 16. The hot flue gases 16 are conducted into a waste heat boiler 17 which is connected in a gas-tight manner to a secondary combustion chamber in which superheated steam 19 is generated from a water supply source 18. The water 18 passes through heating tubes 20 located within the waste heat boiler 17. The superheated steam 19, generated within the tubes 20, is fed to a power plant 21 which consists of steam turbines connected to electro-generators (not shown). The generators produce electric current which is delivered through electrical power lines 22 to electrodes 58 of an electric arc furnace 23. The waste steam 24 exiting from the steam turbine in the power plant 21 is used in a known manner, such as for pre-drying the crude lignite 10 which is to be blown into the charging end of the revolving tubular furnace 7.

The cooled flue gas 25 from the waste heat boiler 17 is fed to a dust removal plant 26. The dust 27 is led off for further utilization and the dust-free cooled flue gas 25 flows through a blower 28 into a chimney (not shown).

The sponge iron, obtained at the discharge end 6 of the tubular furnace 7, drops downwardly through a shaft 29 into a cooling drum 30. The drum 30 is cooled by water which is advantageously circulated in a cooling jacket of the drum and admitted in a direction indicated by the arrow 31. In the cooling drum 30 the sponge iron and the low temperature coke mixed with it are cooled at temperaetures of less than 100°C. The opposite end of the cooling drum 30 leads to a passageway 60 having a gas-tight lock 32 and falls into a preparation plant container 33. In the preparation device 33 the sponge iron and the low temperature coke are separated from each other by sifting and magnetic separation. The separated coke is lead through a coke separation duct 34 for use elsewhere or it can be added, if necessary, to the charging end 5 of the revolving tubular furnace 7 along with the ore pellets which are charged at that location.

The sponge iron is fed, if necessary, together with a residual portion of low temperature coke, over an intermediate conveyor 35 leaving from the preparation device 33 to a charging device 36 for a continuous arc melting furnace 23.

The following test was carried out in a rotary tubular furnace 7 which had a length of 9 meters and an inside diameter of 1.7 meters. The effective working volume of the furnace was about 9 cubic meters. The furnace had a refractory lining and was provided with air blowers 11 and also air supply ducts 12 which projected into the center of the furnace. Further, the air supply ducts were spaced at substantially equal distances along the length of the furnace casing.

A magnetic concentrate having an Fe content of 70% was mixed with 0.5% of bentonite, calculated on the dry weight of the concentrate. This mixture was formed into pellets on a pellet forming disk while spraying water onto the mixture. The pellets had a diameter of 6 – 12.5 millimeters and contained approximately 9% of water. The crushing strength of the green pellets of the grain fraction 10–12.5 mm amounted to 1.5 kg/pellet while the pressure resistance of the dried pellets of the same fraction was 4.0 kg/pellet.

The moist pellets were continuously charged onto the travelling grate 50, and were dried and heated in an oxidizing manner by means of a gas burner to a temperature averaging 1,050°C.

The pellets which were heated to reduction temperature were continuously fed to the rotary tubular furnace 7, practically without loss of sensible heat. At the same time, pre-dried brown coal in mixture with recycled coke was blown continuously into the furnace in the same flow direction as the furnace gases and was distributed over about ¾ of the furnace length on the surface of the charge in the furnace 7. The blowing of the mixture of brown coal and coke was also effected from the upper end of the tubular furnace with the aid of preheated air.

The brown coal, in water-free condition, contains 5.5% of ash, 50.9% of volatile components and 43.6% of carbon. Of the coal 34% was constituted by a grain fraction of 1.6 to 3.15 mm, while 44% had a grain size of 0.5 to 1.6 mm. The remainder of the coal had a grain size smaller than 0.5 mm.

In total, the rotary tubular furnace was charged with:

| | |
|---|---|
| Pellets: | 2.00 ton/hour |
| Lignite: | 1.00 ton/hour; and |
| Recycled coke: | 0.10 ton/hour. |

For maintaining the reduction temperature, air was forced into the furnace and the gases liberated during the low temperature carbonization of the coal and during the reduction were burned in a controlled manner. The air was forced into the furnace by means of blowers secured to the furnace casing.

The reduction product, cooled in the cooling drum 30 was divided by sieving into two fractions at the grain size of 6.3 mm. The grain fraction greater than 6.3 mm consisted exclusively of sponge iron pellets while the fraction less than 6.3 mm was a mixture of low temperature coke and fine grained sponge iron. The sponge iron was separated by means of a magnetic separator and, as with the sponge iron pellets, was conveyed for further processing.

In other tests, the grain fraction less than 1.6 mm of the sponge iron product, was previously removed by sieving, due to strong contamination and was recycled to the pellet forming stage. The non-magnetic product of the magnetic separation, the excess low temperature coke, was recycled, after processing, to the upper end of the rotary tubular furnace and was either again blown into the furnace together with fresh coal or mixed with the preheated pellets at the charging end.

The off-gases were discharged from the furnace at a temperature of about 1,100°C. The resulting sponge iron was metallized to more than 95% and contained 95% of total iron, 0.015% of sulphur and 0.2% of carbon.

Of the sponge iron product obtained, 95% was in the form of pellets, 3.5% was obtained as broken pellets, and only 1.5% was present in a grain size of less than 1.6 mm.

The specific through-put of this test amounted to about 5.4 metric tons of pellets/cubic meter furnace space and 24 hours.

What is claimed is:

1. A method of producing sponge iron by the direct reduction of oxide-containing iron ore comprising the steps of introducing the oxide-containing iron ore into an enclosed heating space, conveying the ore through the space and, as the ore is being conveyed, preheating the ore to reduction temperature by flowing a hot gas in different directions, in relationship to the passage of the ore through the enclosed heating space, maintaining a neutral to oxidizing atmosphere within the heating space, separating the gas used for preheating from the preheated ore and introducing the preheated ore directly from the enclosed heating space into one end of an elongated rotatable reduction chamber, rotating the reduction chamber while passing the ore through the chamber in its elongated direction to the opposite end thereof, blowing a carbonaceous reducing agent by means of compressed air into the reduction chamber from the same end as the preheated ore is introduced and in cocurrent direction with ore and furnace gases in an amount sufficient for the reduction of the ore and reducing the ore within the reduction chamber, adding fresh air at spaced locations along the elongated direction of the chamber, and removing the ore reduced to sponge iron from the opposite end of the reduction chamber, the sources of the hot gas and the furnace gases being independent of one another.

2. A method, as set forth in claim 1, characterized therein by utilizing fine grained high voltaile coal as the fine grained reducing carbonaceous agent for effecting the reduction of the ore within the reduction chamber.

3. A method, as set forth in claim 1, characterized thereby by blowing fine grained pre-dried lignite by means of preheated air as a reducing agent into the reduction chamber.

4. A method, as set forth in claim 1, characterized therein by blowing the carbonaceous reducing agent in mixture with sulfur binding additives into the reducing chamber.

5. A method, as set forth in claim 1, characterized therein by blowing carbonaceous reducing agent into the reducing chamber and by distributing the carbonaceous agent on the surface of the furnace charge over a furnace length in which the oxide-containing iron ore is metallized to between about 50% and 90%.

6. A method, as set forth in claim 1, characterized therein by separating excess low temperature coke in the discharge of the reducing chamber from the sponge iron and by circulating the excess low temperature coke to the charging end of the reducing chamber and refeeding it into said reducing chamber.

7. A method, as set forth in claim 6, characterized therein by blowing the excess coke in mixture with the carbonaceous reducing agent into the reducing chamber.

8. A method, as set forth in claim 6, characterized therein by adding the excess low temperature coke to the iron ore at the charging end of the reducing chamber.

9. A method, as set forth in claim 1, including the steps of maintaining the temperature within the reduction chamber substantially constant between about 1,000° to 1,200°C, but below the softening temperature of the charge, by blowing fresh air over the length of the reduction chamber in the zone wherein the reduction of the iron ore is effected, employing a fine grained coal as the reducing agent which is blown into the reduction chamber into which the preheated ore is introduced and providing an overpressure for directing the waste gases generated within the reduction chamber from the opposite end thereof.

10. A method, as set forth in claim 9, including the steps of withdrawing the waste gases which still contain latent heat from the opposite end of the reduction chamber and introducing the waste gases into a secondary combustion chamber, adding preheated air into the secondary combustion chamber and burning it with the waste gases for providing hot flue gases, removing the hot flue gases from the secondary combustion chamber and employing the hot flue gases for producing electrical power for operating an electric arc melting furnace for melting the sponge iron produced within the reduction chamber.

11. A method, as set forth in claim 10, wherein, for producing electrical power, feeding the hot flue gases into a gas turbine for driving an electro-generator.

12. A method, as set forth in claim 10, wherein, for producing electrical power, flowing the hot flue gases through a waste heat boiler for generating steam and feeding the steam to a stream turbine which is coupled to an electro-generator.

13. A method, as set forth in claim 12, including the step of withdrawing waste steam from the steam turbine and using the waste steam for pre-drying the ore before it is introduced into the enclosed space and also for predrying the fine grained reducing agent which is blown into the reduction chamber.

14. A method, as set forth in claim 10, including the steps of withdrawing the hot sponge iron with at least a part of the residual reducing agent from the opposite end of the reduction chamber and separating it from the waste gases generated within the reduction chamber, and feeding the hot sponge iron and the residual reducing agent with the exclusion of oxygen into a continuous arc melting furnace.

15. A method of producing sponge iron by the direct reduction of oxide-containing iron ore comprising the steps of introducing the ore to an inlet of a preheater; conveying the ore in one direction through the preheater to a discharge; flowing a hot gas from a source thereof through the preheater as the ore is conveyed through the latter, said gas being introduced to said preheater at such temperature as to heat the ore in said preheater substantially to its reduction temperature; separating said gas and said ore at the discharge; introducing said ore at substantially its reduction temperature to one end of a rotatable reduction chamber; rotating said chamber to pass the ore therethrough from said one end of said chamber to its opposite end; maintaining said ore at substantially its reduction temperature as it passes through said reduction chamber; introducing a carbonaceous reducing agent into said reduction chamber from said one end thereof cocurrent with the direction of passage of said ore through said chamber; removing the reduced ore from the opposite end of said reduction chamber; and discharging waste gases from said opposite end of said reduction chamber, said source of hot gas being independent of said waste gases.

16. The method set forth in claim 15 wherein said hot gas is flowed through said preheater in a direction from its discharge toward its inlet.

17. The method set forth in claim 15 wherein said reducing agent is blown into said chamber over a substantial portion of the length of said chamber.

* * * * *